Patented June 16, 1942

2,286,559

UNITED STATES PATENT OFFICE 2,286,559

OXIDATION OF ALICYCLIC KETONES

Sumner H. McAllister, Lafayette, Calif., assignor to Shell Development Company, San Francisco, Calif., a corporation of Delaware No Drawing. Application February 29, 1940, Serial No. 321,478

17 Claims. (Cl. 260—537)

This invention relates to a process for the production of aliphatic dicarboxylic acids, and it more particularly relates to the economic production of aliphatic dicarboxylic acids by the oxidation of cyclic ketones with nitric acid, in the presence or absence of oxidation-promoting catalysts, the operating conditions and particularly the nitric acid concentration being maintained by a novel procedure and control mechanism so as to obtain high yields of the desired aliphatic dicarboxylic acids with a minimum consumption of the nitric acid.

It is known that aliphatic dicarboxylic acids may be prepared by the oxidation of various cyclic organic compounds. Such dicarboxylic acids have been previously produced by the oxidation of cyclic organic compounds of the type of cyclopentane, cyclohexane, alkylated cyclopentanes and cyclohexanes, as well as of cycloaliphatic alcohols and/or ketones, such as cyclobutanol, cyclopentanol, cyclohexanol, cyclohexanone, cyclopentanone, and the like.

It has also been known that the oxidation of these cyclic organic compounds in general requires the use of a relatively strong oxidizing agent, and that such cyclic compounds may be converted into aliphatic dicarboxylic acids by oxidation with nitric acid which may be considered to be one of the most suitable agents for this type of oxidation. Since nitric acid is a relatively expensive oxidizing agent, the economy of the nitric acid oxidation processes is primarily dependent upon the consumption of nitric acid. In spite of the ready availability of a large number of cyclic organic compounds, such as the alicyclic hydrocarbons, cyclic alcohols and cyclic ketones, the nitric acid oxidation of these compounds has not, in the past, been considered economical. This is due mainly to the fact that, under the conditions of oxidation hitherto usually employed, considerable quantities of dicarboxylic acids having a lesser number of carbon atoms than the material being oxidized were invariably produced. Also, when operating in accordance with the processes of the prior art, a substantial quantity of the nitric acid is reduced only to nitrogen peroxide ($N_2O_4$).

It has now been discovered that the above and other defects of the processes heretofore known and employed may be avoided, and that cyclic ketones, i. e. cyclic organic compounds containing a carbonyl group in a non-aromatic ring, may be efficiently and economically subjected to nitric acid oxidation to produce high yields of aliphatic dicarboxylic acids having the same number of carbon atoms per molecule as the cyclic ketone subjected to oxidation. It has been further discovered that such efficient production of dicarboxylic acids may be obtained by effecting the oxidation reaction with nitric acid at a temperature within the range of from about 50° C. to 130° C., and preferably between about 70° C. and 110° C., while continuously maintaining the nitric acid concentration within the range between about 4% and 24% by the continuous addition thereto of concentrated nitric acid. In other words, an economical conversion of cyclic ketones to the corresponding aliphatic dicarboxylic acids may be obtained by effecting the nitric acid oxidation of the cyclic ketones while continuously maintaining the dilute nitric acid solution within the described desired concentration range by the addition thereto of a fortifying nitric acid. When the present process is employed for the continuous production of the dicarboxylic acids, the cyclic ketone may be continuously fed into the reaction zone containing the nitric acid solution of the specified concentration maintained within the described temperature range, the nitric acid concentration being maintained substantially constant by the continuous addition thereto of the fortifying concentrated nitric acid. The reaction mixture, containing the produced aliphatic dicarboxylic acids, may be withdrawn from the reaction zone either continuously or otherwise depending on whether the process is to be effected in a continuous or intermittent manner.

It has been further discovered that the nitric acid oxidation of the cyclic ketones in accordance with the present invention results in a consumption of nitric acid which is less than the theoretical nitric acid consumption based on the complete reduction of the nitric acid to nitric oxide (NO). For example, the theoretical nitric acid consumption for the conversion of cyclopentanone to glutaric acid is 2 moles of nitric acid per mole of glutaric acid produced. In the processes employed heretofore, this theoretical condition was never realized, the consumptions of nitric acid being usually considerably greater because of the fact that a substantial quantity of the nitric acid is reduced only to nitrogen peroxide, and because a considerable amount of such nitric acid is consumed in undesirable side reactions. On the other hand, when the cyclic ketones are oxidized in accordance with the above-outlined and hereinbelow more fully described process, the nitric acid consumption is considerably below the theoretical 2 moles per mole of dicarboxylic acid produced. This is due to the controlled operating conditions which result in a material decrease in side reactions and in a reduction of a considerable proportion of the employed nitric acid to nitrous oxide ($N_2O$), some of the nitric acid being reduced to elemental nitrogen ($N_2$). In this connection it must be noted that the nitric acid oxidation of cyclic ketones according to the present process is more economical than the nitric acid conversion of cyclic alcohols to dicarboxylic acids, even the theoretical nitric acid consumption for such conversion being 2.67 moles per mole of aliphatic dicarboxylic acid produced.

Representative cyclic organic compounds containing a carbonyl group in a non-aromatic ring which may be effectively, efficiently and economically oxidized with nitric acid in accordance with the process of the present invention, include cyclobutanone, 2-methyl-cyclobutanone, 1,1-dimethyl-2-methylene-cyclobutanone, cyclopentanone, 1-methyl-cyclopentanone, 2-methyl-3-isopropyl-cyclopentanone, alpha-cyclopentyl-cyclopentanone, cyclohexanone, 3-methyl-cyclohexanone, 2-methyl-cyclohexanone, 4-methyl-cyclohexanone, 2,2-dimethyl-cyclohexanone, 2,2-diethyl-cyclohexanone, 2,2 - dipropyl-cyclohexanone, alpha-oxycyclohexanone, cycloheptanone, and the like, and their homologues and analogues. As will be apparent to those skilled in the art, by a proper choice of the above and other similar cyclic ketones, it is possible to produce a wide variety of aliphatic dicarboxylic acids.

The most important single factor which governs the consumption of nitric acid and the purity of the product obtained from the nitric acid oxidation of cyclic ketones is the concentration of the nitric acid in the reaction vessel. The temperature at which the nitric acid oxidation is effected is a variable of somewhat less importance. Other factors which affect the economy of the process to some extent are the strength of the fortifying acid and the presence or absence of an oxidation-promoting catalyst.

The concentration of the nitric acid necessary for the efficient oxidation of cyclic ketones to the corresponding aliphatic dicarboxylic acids having the same number of carbon atoms per molecule, is considerably lower than customarily employed for the oxidation of cyclic compounds. In general, the concentration of nitric acid is preferably maintained as low as possible, consistent with a satisfactory reaction rate. In order that the reaction proceed at an appreciable rate using the preferred very low nitic acid concentation, the reaction is preferably executed at a somewhat high temperature. Generally, nitric acid concentrations ranging from about 8% to about 18% are preferred. However, concentrations as low as 4% and as high as 24% may often be employed. Depending upon the concentration of the nitric acid maintained in the reaction zone, and somewhat upon the cyclic ketone subjected to the oxidation therein, the temperature at which the oxidation is executed may range from about 50° C. to 130° C., although temperatures between about 70° C. and 110° C. are preferred.

The yield and purity of the final product are somewhat dependent upon the concentration of the fortifying acid continuously added to maintain continuously the desired concentration of nitric acid in the reaction zone. Generally, acid concentrations of about 50% to 70% $HNO_3$ have been found to be preferable to the more dilute acids which, however, may also be employed in some cases as the fortifying acid which is continuously introduced into the reaction zone to maintain therein a substantially uniform nitric acid concentration throughout the reaction.

This process may be satisfactorily carried out with or without the aid of an oxidation-promoting catalyst. Any of the conventional oxidation catalysts such as the oxides and salts of the polyvalent metals are applicable and may be used if desired. The presence of a catalyst tends, in general, other factors being equal, to increase somewhat the yield and through-put capacity, to allow the use of somewhat lower temperatures, and to increase the ratio of nitrogen to nitric oxide in the exit gases. In these respects, the use of the catalysts is advantageous. On the other hand, the presence of these catalysts during the nitric acid oxidation tends to increase the amount of lower dicarboxylic acids produced.

The preferred operating conditions, particularly as to the nitric acid concentration and the temperature, may vary within the above-described limits depending upon the character of the cyclic ketone subjected to the nitric acid oxidation. Generally, non-alkylated monocyclic ketones, such as cyclopentanone, cyclohexanone and the substituted derivatives thereof, require more severe oxidizing conditions, i. e. higher concentrations of nitric acid and/or higher temperatures, than their homologues containing alkyl side-chains. Cyclic ketones containing relatively long side-chains and ketones in which gem. alkyl groups are present, such as the pentyl cyclohexanones, gem. diethylcyclopentanone and the like, in particular, are preferably oxidized under the most mild conditions, i. e. acid concentrations of about 4% to 8%, and at moderate temperatures. Although the oxidation may be efficiently realized at atmospheric pressures, somewhat higher or lower pressures may also be employed. In fact, the use of somewhat higher pressures may often be advantageous in that such pressures may allow the oxidation in a liquid state or phase and at higher temperatures, i. e. temperatures which are above the normal boiling point of the reaction mixture.

The process may be effected in a batch, intermittent or continuous manner, it being understood that an essential feature of any apparatus for such oxidation is the provision of means whereby the concentration of the nitric acid in the reaction zone is maintained within the defined limits by the continuous introduction thereinto of relatively concentrated fortifying nitric acid. For instance, the apparatus may include a reaction vessel equipped with a stirrer and containing dilute nitric acid of the desired concentration. This vessel may also contain means, such as a coil, for maintaining the desired reaction temperature. The cyclic ketone may be continuously or otherwise introduced into this vessel from an outside storage tank, or the like. The fortifying, relatively concentrated nitric acid is also introduced into the reaction vessel at such a rate that the dilute nitric acid therein is maintained within the described desired range of concentration. The crude reaction mixture, which consists essentially of the desired aliphatic dicarboxylic acid and dilute nitric acid, may be withdrawn continuously or intermittently, preferably from the bottom of the reaction vessel, and may then be treated to separate the dicarboxylic acid or acids from the dilute nitric acid. The fixed gases produced as a by-product of the oxidation reaction, may be withdrawn from the top of the reaction vessel, preferably after passage through a condenser which liquefies and returns into the reaction vessel any vapors of the unreacted ketone and/or nitric acid.

The process may also be effected in a continuous manner in an apparatus in which a mixture of the cyclic ketone and of the dilute nitric acid is continuously recirculated, as by means of a pump, through a reaction zone provided with packing, baffles, and/or reaction-promoting catalyst. Such an apparatus may then be provided with means for the continuous withdrawal of a portion of the crude reaction product, as well as with means for the continuous introduction into the system of fresh cyclic ketones and of the fortifying nitric acid. As another embodiment, the reactants may be circulated countercurrently through a tower provided with baffles or filled with glass rings or other suitable packing, the heated dilute nitric acid of regulated concentration being fed in at the top and withdrawn at the bottom while the cyclic ketone is fed in near the bottom and the unreacted vapors withdrawn with the gaseous reaction products from the top. The reaction may also be executed in a plurality of reactors connected in series or in a tubular reactor. The apparatus should, of course, be resistant to hot dilute nitric acid. In general, equipment having an acid-proof lining and equipment manufactured from corrosion resistant alloys, such as duriron, stainless steel, etc., are applicable.

The crude reaction product withdrawn from the reaction zone contains the desired aliphatic dicarboxylic acid in solution in dilute nitric acid along with any unoxidized cyclic ketone and small amounts of other products of side reactions. Although the desired dicarboxylic acid may be recovered from the crude reaction mixture by any one of several methods, it has been found highly advantageous to first concentrate the solution to a point where a substantial quantity of the desired dicarboxylic acid may be crystallized out upon cooling. This concentration may be most advantageously accomplished by conducting the crude reaction mixture, preferably without any pre-cooling, continuously into a suitable fractionating or stripping apparatus wherein a substantial portion of the water and nitric acid are removed. Such a process is advantageous since the last traces of unreacted cyclic ketone withdrawn with the reaction mixture undergo reaction during this flashing operation. Also, it obviates the continuous loss of a small amount of unreacted ketone which could not be economically recovered. By subjecting the hot crude reaction mixture to the mentioned substantially immediate flash distillation, the time that the dicarboxylic acids are in contact with hot nitric acid is kept at a controlled minimum. This helps to maintain a high yields and a pure product. The saving of heat afforded by this method is also of some commercial advantage. The dilute nitric acid solution recovered from such concentration step may be easily reconcentrated and recycled.

The greater portion of the desired aliphatic dicarboxylic acid may in most cases be separated from the hot concentrated solution (from the above-outlined concentration) by a simple cooling which causes the dicarboxylic acid to crystallize out. The crystal strike thus obtained, after separating from the mother liquor, may be further purified, if desired, by drying at 30° C. to 50° C., preferably under decreased pressure, dissolving in a suitable solvent, such as acetone, decolorizing if desired, for instance, by a charcoal treatment preferably with degassed charcoal, and by finally recovering the pure dicarboxylic acid from the solvent solution. Obviously, other conventional methods of purification, such as solvent extraction, etc., may also be used. Since the mother liquor from the first crystallization may still contain appreciable quantities of aliphatic dicarboxylic acids, this solution, if desired, may be further concentrated, and a second strike of dicarboxylic acids may be crystallized out. The final liquor remaining after any number of concentrations and crystallizations, consists essentially of concentrated acid, but still contains traces of the dicarboxylic acid. This final liquor may be reused in the process, for example, as the fortifying nitric acid added to maintain the desired nitric acid concentration in the reaction zone.

For the purpose of a better understanding of the present process, reference is made to the following example in which glutaric acid was produced by the nitric acid oxidation of cyclopentanone. It is to be understood, however, that there is no intention of being limited by the described details of operation since numerous variations and modifications, which are within the scope of the appended claims, will be apparent to those skilled in the art.

*Example*

Cyclopentanone was introduced continuously at a rate of about 111 grams per hour per liter of reaction mixture into a reaction vessel provided with a stirrer and containing a nitric acid solution the initial $HNO_3$ concentration of which was about 10.1%. In order to maintain the desired nitric acid concentration, a fortifying acid consisting of 70% nitric acid was also continuously fed into the reaction vessel which was maintained at a temperature of about 80° C. to 85° C., and a pressure of 35 pounds per square inch, absolute. Due to the slightly high rate of introduction of the fortifying acid, the nitric acid concentration in the reaction vessel rose gradually and was about 13.5% $HNO_3$ at the end of the run. An analysis of the reaction products showed that there was a substantially complete conversion of the cyclopentanone, the yield of dicarboxylic acids being between about 92% and 95%. Substantially all of the organic dicarboxylic acid was glutaric acid with less than 2% of succinic acid present in the reaction mixture. The nitric acid consumption was about 1.8 moles per mole of dibasic acid produced, thus indicating that the nitric acid consumption of this process is less than theoretical as based on the conversion of nitric acid to nitric oxide. Although the process was effected under pressure, it may also be realized under atmospheric pressure.

The described process has distinct advantages over the previously known processes since the desired dicarboxylic acids may be obtained in excellent yields. In general, as stated, the yields depend upon the compound being oxidized and may vary considerably. The non-alkylated cyclic ketones, in particular, give almost quantitative yields when oxidized according to the present process. For example, the yields of dicarboxylic acids from these ketones generally exceed 90%, and, under optimum operating conditions, are often between about 98% and practically 100%. The crude dicarboxylic acids prepared according to the present process contain, in general, only small percentages of monocarboxylic acids and dicarboxylic acids of lower molecular weight. The amount of such dicarboxylic acids having a lesser number of carbon atoms per molecule than the carbon atoms per molecule of the material being oxidized depends, of course, upon the material subjected to oxidation, the prevailing conditions, and the presence or absence of a catalyst, and may vary considerably. Nevertheless, the amount of such lower molecular weight acids usually does not exceed 10%, and, when operating under favorable conditions, is frequently below 2% or 3%.

This application is a continuation-in-part of my co-pending application, Serial No. 234,030, filed October 8, 1938, which issued as U. S. Patent No. 2,193,562.

I claim as my invention:

1. A process for the production of glutaric acid which comprises continuously introducing cyclopentanone into a nitric acid-containing solution maintained at a temperature between 70° C. and 110° C., maintaining the concentration of said nitric acid in said solution between about 8% and 18% by continuously introducing fortifying nitric acid, removing the crude reaction mixture and recovering glutaric acid therefrom.

2. The process according to claim 1 wherein the reaction is effected under a superatmospheric pressure and at a temperature of about 80° C. to 85° C.

3. A process for the production of an aliphatic dicarboxylic acid which comprises continuously introducing a non-alkylated cyclic ketone into a nitric acid-containing solution maintained at a temperature between 70° C. and 110° C., maintaining the concentration of the nitric acid in said solution between about 4% and 24% by introducing fortifying nitric acid as required, continuously removing the crude reaction mixture and recovering an aliphatic dicarboxylic acid therefrom.

4. The process according to claim 3 wherein the fortifying nitric acid is added continuously and wherein said acid is of a concentration of between about 50% and 70% $HNO_3$.

5. A process for the production of an aliphatic dicarboxylic acid which comprises continuously introducing a non-alkylated cyclic ketone into a nitric acid solution maintained at a temperature above 50° C., maintaining the concentration of said nitric acid solution between 4% and 24% by introducing fortifying nitric acid as required, removing the crude reaction mixture and recovering the aliphatic dicarboxylic acid therefrom.

6. A process for the production of an aliphatic dicarboxylic acid which comprises reacting a cyclic ketone with a nitric acid solution maintained at a temperature between 70° C. and 110° C., maintaining the concentration of said nitric acid solution between 8% and 18% by introducing more concentrated nitric acid, removing the crude reaction mixture and concentrating the same by distillation, crystallizing aliphatic dicarboxylic acid from the concentrated reaction mixture and finally purifying the aliphatic dicarboxylic acid by treatment with degassed charcoal.

7. In a process for the production of an aliphatic dicarboxylic acid which includes the introduction of an alicyclic ketone into a nitric acid-containing solution maintained at temperature between 70° C. and 110° C., the step of maintaining the concentration of the nitric acid in said solution between about 4% and 24% substantially throughout the reaction between the nitric acid and the alicyclic ketone by the addition of fortifying nitric acid as required, whereby nitric acid is consumed economically.

8. In a process for the production of an aliphatic dicarboxylic acid, the steps of reacting a cyclic ketone in the presence of an oxidation-promoting catalyst with a nitric acid solution maintained at a temperature between about 70° C. and 110° C., maintaining the concentration of said nitric acid solution between about 8% and 18% by introducing more concentrated nitric acid, removing the crude reaction mixture, concentrating said mixture by distillation, and recovering the dicarboxylic acid from said concentrated reaction mixture.

9. The process according to claim 8, wherein the aliphatic dicarboxylic acid is recovered from the concentrated reaction mixture by crystallization.

10. In a process for the production of an aliphatic dicarboxylic acid, the steps of reacting a cyclic ketone in the presence of an oxidation-promoting catalyst with a nitric acid solution maintained at a temperature between about 70° C. and 110° C., maintaining the concentration of said nitric acid solution between about 8% and 18% by continuously introducing more concentrated nitric acid, removing the crude reaction mixture and recovering the aliphatic dicarboxylic acid therefrom.

11. In a process for the production of an aliphatic dicarboxylic acid, the steps of reacting a cyclic ketone in the presence of an oxidation-promoting catalyst with a nitric acid solution maintained at a temperature of above 50° C., maintaining the concentration of said nitric acid solution between about 8% and 18% by introducing more concentrated nitric acid, removing the crude reaction mixture and recovering the aliphatic dicarboxylic acid therefrom.

12. In a process for the production of an aliphatic dicarboxylic acid, the steps of reacting a cyclic ketone in the presence of an oxidation-promoting catalyst with a nitric acid solution maintained at a temperature of above 50° C., maintaining the concentration of said nitric acid solution between about 4% and 24% by introducing more concentrated nitric acid, removing the crude reaction mixture and recovering the aliphatic dicarboxylic acid therefrom.

13. In a process for the production of an aliphatic dicarboxylic acid, the steps of reacting a cyclic ketone with a nitric acid maintained at a temperature of above 50° C., maintaining the concentration of said nitric acid solution between about 4% and 24% by continuously introducing more concentrated nitric acid, removing the crude reaction mixture and recovering the aliphatic dicarboxylic acid therefrom.

14. In a process for the production of glutaric acid, the step of continuously oxidizing cyclopentanone with a nitric acid solution maintained between 4% and 24% nitric acid concentration and at a temperature of between about 50° C. and 130° C.

15. In a process for the production of an aliphatic dicarboxylic acid, the step of continuously oxidizing a cyclic ketone in nitric acid solution maintained between 4% and 24% nitric acid concentration and at a temperature of between about 50° C. and 130° C.

16. In a process for the production of an aliphatic dicarboxylic acid, the steps of forming a body of reaction solution containing dilute nitric acid in a reaction zone, continuously introducing a cyclic ketone into said body of reaction solution to form the aliphatic dicarboxylic acid, continuously introducing a concentrated fortifying nitric acid into said reaction zone to maintain the concentration of the dilute nitric acid in said zone substantially constant, and continuously withdrawing the reaction mixture comprising dilute nitric acid and the dicarboxylic acid from said reaction zone at a rate correlated to the rate of additions to said zone so as to maintain a substantially constant body of reaction solution in said zone.

17. In a process for the production of an aliphatic dicarboxylic acid, the steps of forming a body of reaction solution containing dilute nitric acid in a reaction zone, feeding a cyclic ketone to said body of reaction solution, introducing a fortifying nitric acid into said reaction zone at a rate sufficient to maintain oxidizing conditions and dilute nitric acid in said reaction zone, and withdrawing the reaction mixture containing formed aliphatic dicarboxylic acid from said reaction zone at a rate correlated to the rate of additions to said zone so as to maintain a body of reaction solution in said zone.

SUMNER H. McALLISTER.